United States Patent [19]
Holzapfel et al.

[11] Patent Number: 5,648,658
[45] Date of Patent: Jul. 15, 1997

[54] APPARATUS AND METHOD FOR GENERATING POSITION-DEPENDENT SIGNALS USING A SCANNING PLATE HAVING A PLURALITY OF DIFFERENTLY CONFIGURED SCANNING REGIONS

[75] Inventors: Wolfgang Holzapfel, Obing; Walter Huber, Traunstein, both of Germany

[73] Assignee: Johannes Heidenhain GmbH, Traunreut, Germany

[21] Appl. No.: 392,594

[22] Filed: Feb. 23, 1995

[30] Foreign Application Priority Data

Feb. 23, 1994 [DE] Germany ............... 44 05 843.8
Sep. 7, 1994 [DE] Germany ............... 44 31 899.5

[51] Int. Cl.⁶ ............... H01J 3/14; H01J 5/16; G01B 11/02
[52] U.S. Cl. ............... 250/237 G; 250/231.14; 356/356
[58] Field of Search ............... 250/231.14, 231.16, 250/231.18, 237 G; 341/14, 31; 356/375, 356

[56] References Cited

U.S. PATENT DOCUMENTS

| | | |
|---|---|---|
| 4,385,836 | 5/1983 | Schmitt . |
| 4,461,083 | 7/1984 | Ernst . |
| 4,677,293 | 6/1987 | Michel . |
| 4,757,196 | 7/1988 | Yamada et al. ............ 250/231 SE |
| 4,778,273 | 10/1988 | Michel ............ 356/374 |
| 4,985,623 | 1/1991 | Ichikawa et al. ............ 250/231.16 |
| 4,988,864 | 1/1991 | Michel et al. ............ 250/231.16 |
| 5,061,073 | 10/1991 | Michel . |
| 5,177,356 | 1/1993 | Matsui et al. ............ 250/231.16 |
| 5,204,524 | 4/1993 | Ichikawa et al. ............ 250/237 G |
| 5,214,280 | 5/1993 | Rieder et al. ............ 250/237 G |
| 5,428,445 | 6/1995 | Holzapfel ............ 356/356 |
| 5,483,059 | 1/1996 | Igaki et al. ............ 250/231.16 |

FOREIGN PATENT DOCUMENTS

| | | |
|---|---|---|
| 0363620B1 | 8/1989 | European Pat. Off. . |
| 0513427A1 | 5/1991 | European Pat. Off. . |
| 3416864C2 | 5/1984 | Germany . |
| 4212281C2 | 4/1992 | Germany . |
| 1292181A1 | 12/1984 | U.S.S.R. . |
| 2 238 865 | 6/1991 | United Kingdom . |

*Primary Examiner*—Stephone Allen
*Attorney, Agent, or Firm*—Brinks Hofer Gilson & Lione

[57] ABSTRACT

In this apparatus, which serves preferably to generate reference pulses, graduations are provided on the scanner plate (A), whose graduation period varies steadily as a function of location (chirped grating). The various graduation markings (GS) are embodied in turn as periodic phase gratings, whose graduation scores extend parallel to the measurement direction (X).

36 Claims, 7 Drawing Sheets

FIG.10a
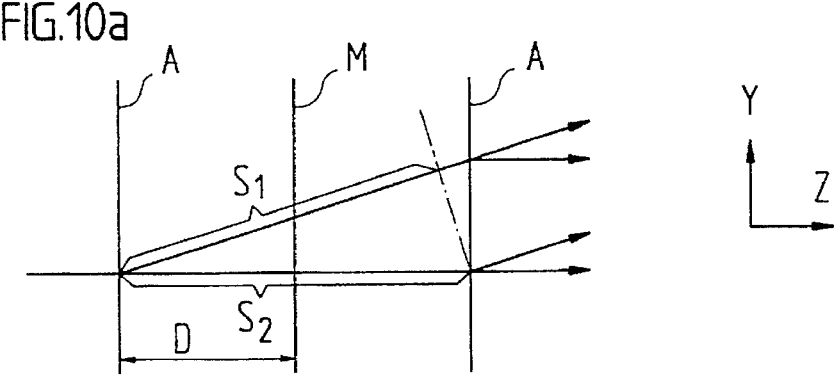
FIG.10b
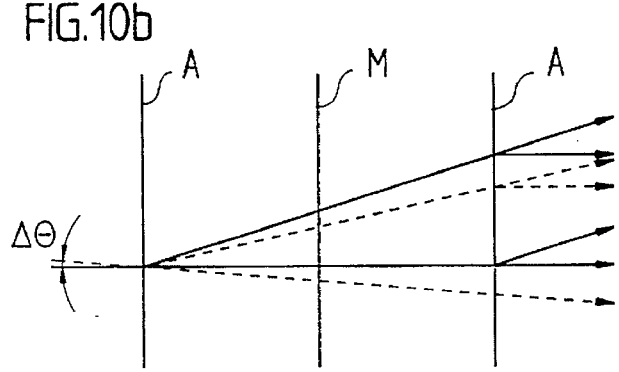
FIG. 9
FIG.10c
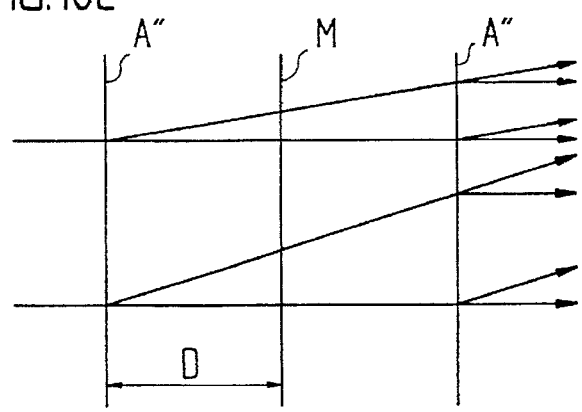
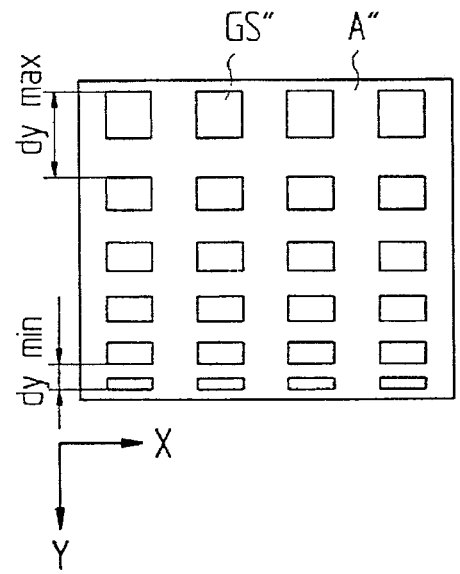
FIG.10d
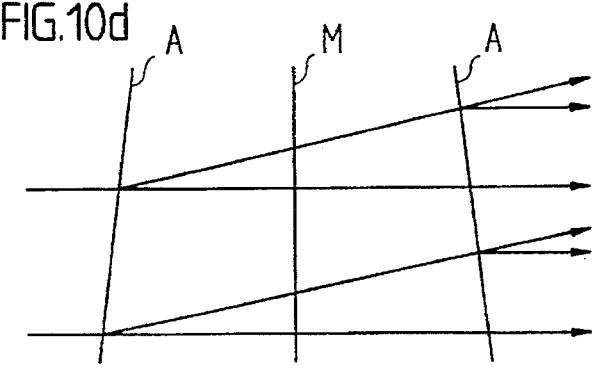

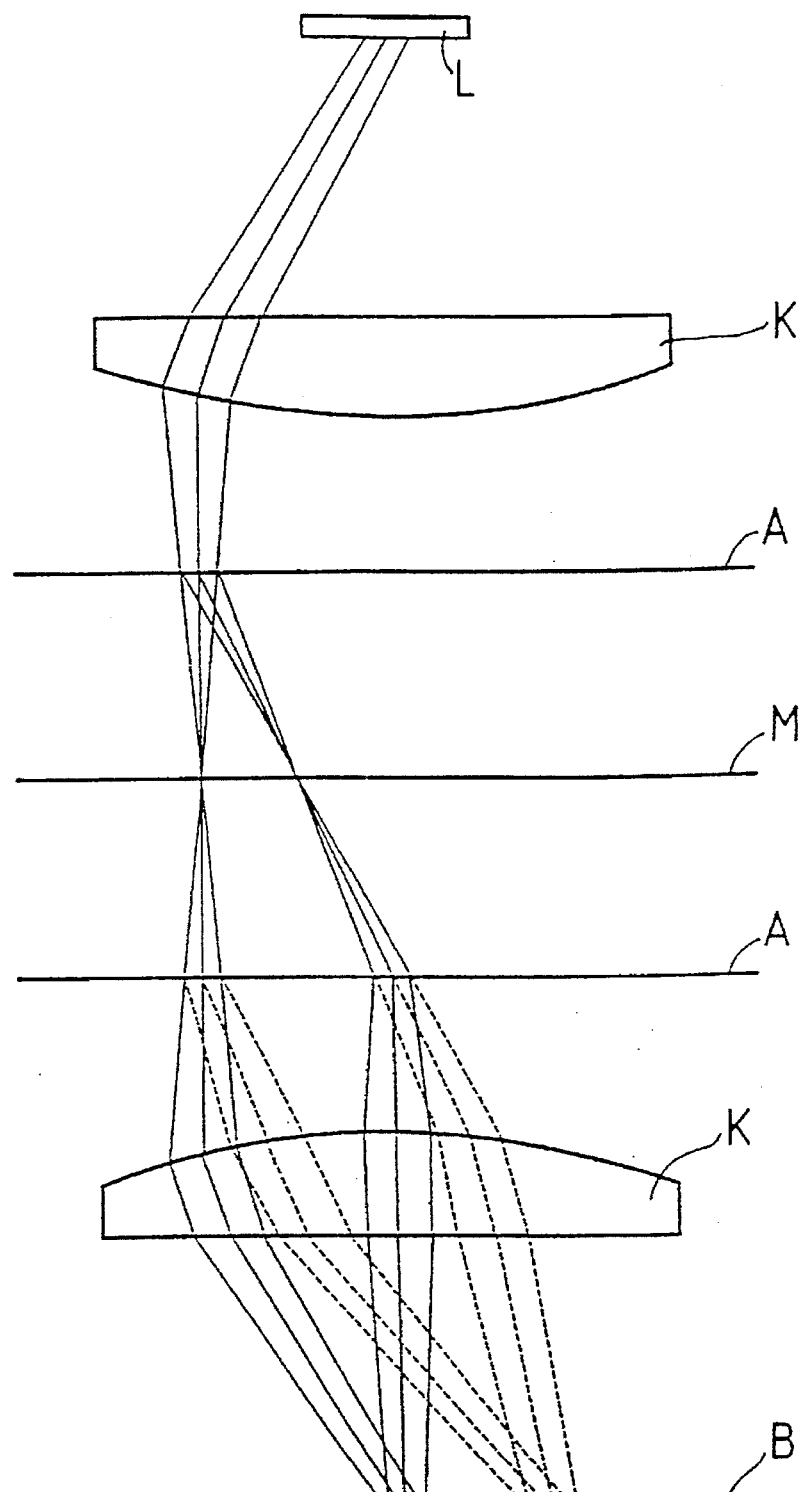
FIG. 11
FIG. 12
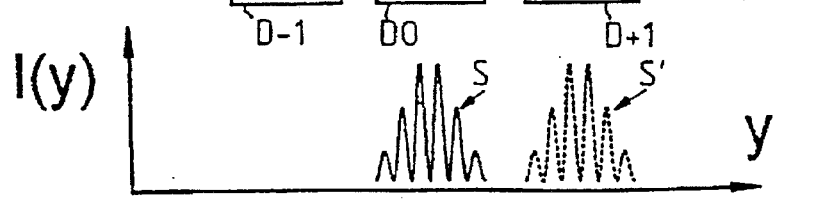

APPARATUS AND METHOD FOR GENERATING POSITION-DEPENDENT SIGNALS USING A SCANNING PLATE HAVING A PLURALITY OF DIFFERENTLY CONFIGURED SCANNING REGIONS

BACKGROUND OF THE INVENTION

The invention relates to an apparatus and method for generating position-dependent signals, and, more particularly, to an apparatus and method which allows single-field phase-opposition scanning. German Patent DE 34 16 864 C2 discloses a measuring instrument having a scale with a reference mark whose graduation markings are embodied as transverse phase gratings. In-phase and phase-opposition signals can be derived from a reference mark field.

Soviet Union Patent Disclosure SU 1292181 A1 describes a similar instrument, in which an encoded scale graduation is scanned, the graduation markings of which are embodied in the form of transverse phase gratings. The grating constants of these transverse phase gratings of individual graduation markings differ so that the incident light is deflected in different directions and detected by various photoelements. The transverse phase gratings are embodied nonperiodically, so as to focus the incident collimated light in a certain direction.

With reference to both of the measuring instruments described above, the beam originating at the light source interacts only once with the transverse phase gratings of the scale. The beam is split transversely into various partial beams that are then no longer superimposed as the beam course continues. In order to attain significant transverse splitting of these partial beams, the grating constants of the transverse phase graduations must be quite small. This is unfavorable since fine transverse phase grating must be applied to the scale, which can also be quite large, thereby making stringent demands on the production processes, and causing production costs to rise considerably.

In addition, the reference mark disclosed in DE 34 16 864 C2 is based on the principle of shadow casting which only allows brief pulses to be generated at a very short spacing distance.

European Patent Disclosure EP 0 363 620 B1 discloses a measurement instrument operating on the principle of shadow casting scanning wherein short reference pulses are generated by two slightly displaced reference mark fields. Separating the beams of the reference pulse single-phase signals from one another and from the incremental signals requires certain optical configurations which lead to large dimensions of the scanner head. Moreover, at least three photoelements and correspondingly many electrical signal lines are required for the reference mark alone.

According to European Patent Disclosure EP 0 513 427 A1, a brief reference pulse is generated at a long spacing distance with the aid of chirped graduations and interferential scanning. The scanning principle requires that the resultant orders of diffraction emerging from the graduation arrangement be distributed to various photoelements. If wider reference pulses are to be generated, then larger local graduation periods of the chirped graduations are needed, and correspondingly longer focal lengths of the lenses are needed to separate the orders of diffraction. Once again, a small structure of the scanner head is impossible.

German Patent DE 42 12 281 C2 discloses an interferential reference mark which, because of the use of an amplitude scanning graduation, eliminates the need to separate the resultant orders of diffraction. In this way, reference pulses with a width even greater than approximately 1μ can be generated with a small structural form. Scanning with an amplitude structure does lower the useful portion of the reference pulse so that only a simultaneous generation of in-phase and phase opposition signals from one graduation field would assure adequate insensitivity to noise or interference. This kind of single-field phase-opposition scanning, however, is not possible with the reference mark described.

SUMMARY OF THE INVENTION

An object of the present invention is to provide an apparatus for generating position-dependent signals, or in other words incremental, encoded or reference signals, which are insensitive to noise and which at the same time can be made simply with a small structure.

An advantage of the present invention is that the transverse phase gratings, which because of their small grating constant make high demands on the photolithographic copy process, need not be applied to the scale but rather to the substantially smaller scanner plate. Since the measurement apparatus according to the present invention can operate using the incident light principle in which the beams pass twice through the scanner plate, measurement signals that do not, or only slightly, depend on the spacing distance between the scanner plate and the measurement embodiment, i.e. scale, are obtained within an allowable range.

Another advantage of the present invention is that the graduation markings on the scanner plate can also be embodied on the scale by means of a phase structure. Particularly the embodiment as a reference mark or encoded measuring apparatus can thus be produced especially simply together with the phase structures of an incremental measuring instrument. Additional copying steps with high positional accuracy are thus no longer necessary.

The invention itself, together with further objects and attendant advantages, will best be understood by reference to the following detailed description, taken in conjunction with the accompanying drawings.

BRIEF DESCRIPTION OF THE DRAWINGS

FIG. 9 illustrates a scanner plate according to a preferred embodiment of the present invention.

FIGS. 10a–10d illustrates various beam paths for various scanning arrangements of the present invention.

FIG. 11 illustrates an optics diagram for a particular scanning arrangement according to a preferred embodiment of the present invention.

FIG. 12 is a graph of the intensity of the detected beams in the focal plane of the condenser lens.

DETAILED DESCRIPTION OF THE PRESENTLY PREFERRED EMBODIMENTS

Figure 1:
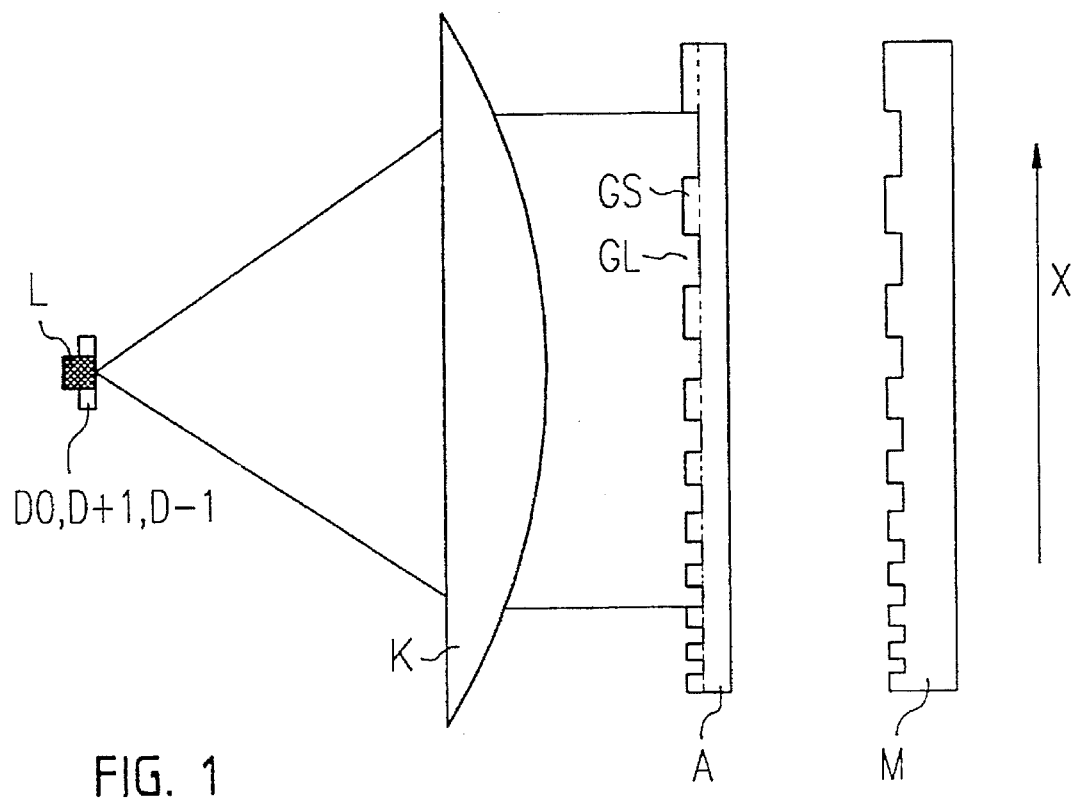
FIG. 1 is a schematic of a measuring apparatus according to a preferred embodiment of the present invention.

FIG. 1 is a schematic of an incremental measuring apparatus according to a preferred embodiment of the present invention. The measuring apparatus includes a light source L, collimating lens K, scanner plate A, scale M and photo detectors D0, D+1 and D−1. In a preferred embodiment, the scanner plate A is mounted on a first object (not shown) and the scale M is mounted on a second object (not shown) movable with respect to the first object. The first object may be the bed of a machine tool and the second object may be a tool slide, for example. The light of a light source L is collimated by a lens K and illuminates the scanner plate A and scale M. In a preferred embodiment, scale M is reflective. Because the measuring apparatus operates reflectively as opposed to transmitted light systems, the light beams pass twice through the scanner plate A. The collimator lens K deflects the emerging beam of light onto a plurality of photoelements D0, D±1, which furnish an in-phase and a phase-opposition signal, respectively.

Figure 2:
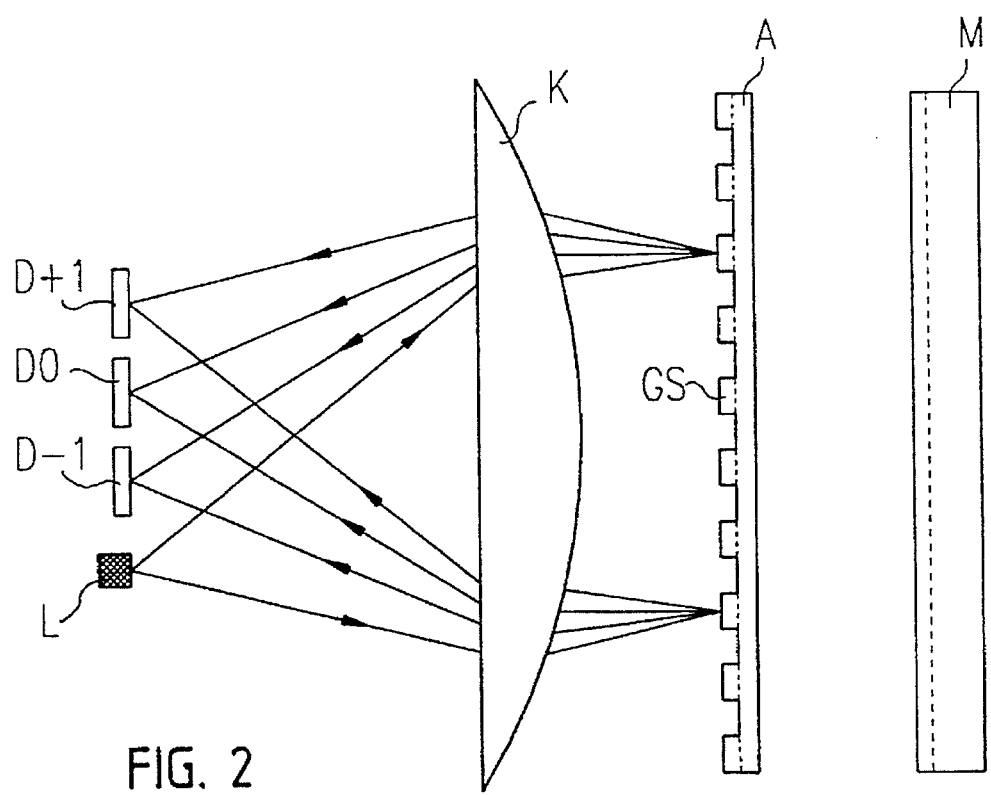
FIG. 2 is a schematic of the measuring apparatus shown in FIG. 1 rotated by 90°.

FIG. 2 illustrates the measuring apparatus shown in FIG. 1 rotated 90°. From this perspective, the placement of the light source L and photoelements D0 and D±1 with respect to the scanner plate A and scale M are illustrated.

Figure 3:
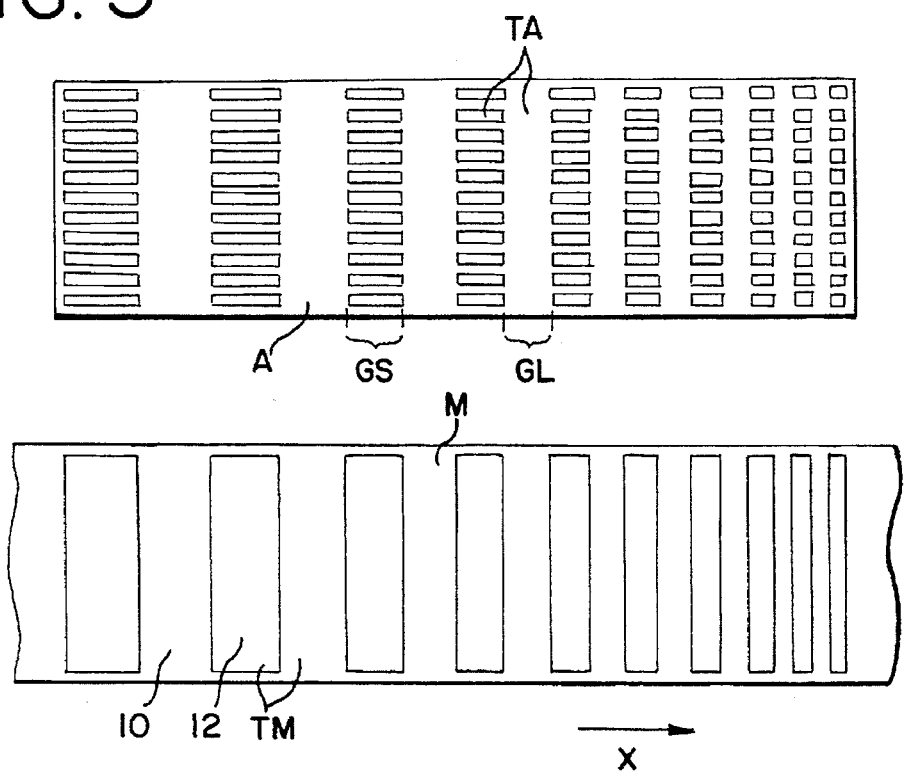
FIG. 3 illustrates a scanner plate and measuring graduation of a measuring apparatus according to a preferred embodiment of the present invention.

FIG. 3 illustrates a front view of the scanner plate A and scale M according to a preferred embodiment of the present invention. The scale M carries a chirped phase graduation TM with reflective and nonreflective lands 10 and 12 respectively that alternate in the measurement direction X. Each land extends at right angles to the measurement direction X as shown. The scanner plate A has a graduation TA which is formed by a phase structure chirped in the measurement direction X. The graduation TA includes transparent gaps GL alternating between groups of structured lands GS The width and spacing of the structured lands GS varies steadily in the measurement direction X as shown. The group of structured lands GS are striplike periodic phase gratings, with each land extending at least largely parallel to the measurement direction X.

The effect of this scanner plate structure can be more fully understood by successively observing the directions of the beams of light which pass through the scanner plate A or are deflected transversely to the measurement direction X, in the distant field, or in other words the beams deflected into various transverse orders of diffraction. Each land of the group of structured lands GS deflects the beam of light in various "transverse" orders of diffraction at least largely at right angles to the measurement direction. The structured lands GS are embodied such that the transverse zeroth order of diffraction of the grating strip is suppressed. In the transverse zeroth order of diffraction, light passes through the gaps GL but not through the structured lands GS. The scanner structure therefore appears in the form of a chirped amplitude graduation with transparent gaps GL and opaque lands GS. If one looks at the ±1st transverse order of diffraction, one no longer receives light from the gaps GL but does receive light from the structured lands GS. The scanner structure thus appears in the form of inverse chirped amplitude graduation with opaque gaps GL and transparent lands GS. Instead of the transparent gaps GL, transverse grating strips could also be used, whose lands likewise extend parallel to the measurement direction; the graduation period of the grating in the region GS differs from the graduation period of the grating in the region GL.

Hereafter, the beams that are deflected in the nth order of diffraction upon the first passage through the scanner plate A and into the mth transverse order of diffraction upon the second passage through the scanner plate A will be called n/m beams. The 0/0 beam emerges from the graduation arrangement with a resultant zeroth order of diffraction and strikes the photoelement D0. This beam, upon both passages, "sees" the scanner structure as a regular (in other words not inverse) amplitude graduation and generates a corresponding signal portion. In particular, the positions of the land edges of the chirped graduations determine the signal course of this signal portion and can be chosen by way of example such that an in-phase or a phase-opposition signal portion is generated. Such a provision is more fully described in U.S. Pat. No. 5,428,445 which is specifically hereby incorporated by reference, so that further description of this aspect is unnecessary.

With reference to FIG. 11, the +1/−1 and the −1/+1 beam likewise emerges in the resultant zeroth order of diffraction and is deflected toward the photoelement D0. FIG. 11 illustrates the beam paths in an exploded view wherein two scanner plates A and two condenser lens K are illustrated where in reality, only one of each exists because scale M is reflective. In this case, the scanner structure acts twice as an inverse amplitude graduation. When looked at locally, the transition from a regular amplitude graduation to an inverse amplitude graduation is equivalent to a displacement of the scanner plate A by one-half of a graduation period. In the interferential scanning principle involved here (superposition of a +1st and a −1st order of diffraction of the scale M, or in other words diffraction in the measurement direction X; one graduation period equals two signal periods), such a displacement causes a phase variation of the signal by 360°, or in other words to the original phase location. The transition to an inverse amplitude graduation therefore does not change the signal form, so that the +1/−1 and the −1/+1 beams are just as modulated as the 0/0 beam. The same is true for all the other n/−n beams that reach D0, which likewise emerge with a resultant zeroth order of diffraction or in other words at right angles to the scanner plate A.

The ±1/0 and the 0/±1 beam emerges with a ±1st resultant order of diffraction and arrives at the photoelements D±1. With these beams, the scanner plate A structure acts once as a regular amplitude graduation and once as an inverse amplitude graduation. The signal source of the associated signal portions of D+1 and D−1 is identical for reasons of symmetry. A more detailed analysis shows that these signal portions are modulated inversely to the signal of the photoelement D0. If the photoelement D0 for instance furnishes an in-phase signal (or phase-opposition signal), then an associated phase-opposition signal (or in-phase signal, respectively) is received by way of D+1 or D−1, respectively. The desired single-field phase-opposition scanning is thus attained.

Taking into account all the arbitrary n/m beams, it proves to be especially favorable to suppress all the even-numbered transverse orders of diffraction of the structured lands GS, for instance by embodying them as stepped gratings with equal land and gap widths and with a phase depth of 180°. Moreover, it is advantageous to choose equal local widths for the lands GS and gaps GL of the chirped graduation.

If the measurement apparatus operates by the interferential scanning method described in which beams of the ±nth order symmetrically diffracted in the measurement direction X, preferably of the ±1st order, interfere with one another, then it is also advantageous for the scale M to be embodied such that the 0th order of diffraction is suppressed.

The beams that upon the first passage through the scanner plate A are split into various transverse orders of diffraction are superimposed on the second passage, each into the various resultant orders of diffraction. This superposition must be done incoherently, since if there were coherent superposition the various optical path lengths would lead to an overly strong dependency of the signal form on the spacing distance between the scanner plate A and the scale M. An incoherent superposition does not mean that the various partial beams that are superimposed are no longer allowed to interfere with one another. This can equally be achieved by averaging many different path length differences of the partial beams interfering with one another, so that no uniform constructive or destructive interference any longer occurs in the total of the beams originating at the light source and detected by each of the photoelements; that is, an incoherent superposition of the total of the partial beams is attained. The generation of various path length differences or in other words the incoherent superposition can be attained by various provisions; it does not matter if the measuring apparatus involves incremental, encoded or reference signals.

An incoherent superposition of identical resultant orders of diffraction is attained in that the partial beams, of a single illuminating partial beam, that are transversely diffracted upon the first passage through the scanner plate A are split after the second passage through the scanner plate A into a plurality of identical resultant orders of diffractions (referred to the direction); these resultant orders of diffractions cannot interfere with one another. This is attained in that the light source L has a wide wavelength spectrum and a short coherence length.

The spacing distance D, that is, the distance between the scanner plate A and the scale M, is accordingly chosen to be so great in FIG. 10a that the path length difference $S_2 - S_1$ becomes greater than the coherence length of the light source L, and the beams split into various transverse orders of diffractions upon the first passage through the scanner plate A, which are superimposed upon the second passage through the scanner plate A, cannot interfere with one another. Unless further provisions are combined with one another, the spacing distance D must be chosen in accordance with equation (1) below, as a function of the transverse grating constant $d_y$ and the spectral width $\Delta\lambda$ of the light source L:

$$D > 0.3 \frac{d_y^2}{\Delta\lambda} \quad (1)$$

A further possibility for the incoherent superposition is that, while the resultant orders of diffractions of a single illuminating partial beam are allowed to interfere with one another, nevertheless because of the averaging effect of a plurality of such interferences, the coherence is destroyed overall. Provisions are made here by which a plurality illuminating partial beams generate various path length differences, as will be described in detail hereinafter.

An incoherent superposition can be attained especially advantageously by means of a spatially expanded light source L at right angles to the measurement direction X (that is, in the y direction), and/or with a broad wavelength spectrum or in other words a short coherence length. An LED can preferably be used as this kind of spatially and chronologically incoherent light source; as its light-emitting surface, the LED may have an elongated cross section at right angles to the measurement direction X.

The interference of the aforementioned partial beams can also be destroyed by different directions of incidence $\Delta\theta$ (in the y direction) of a partial beam, as shown in FIG. 10b. Given a corresponding divergence, the distance-dependent interference terms average to form a constant value. This divergence can be attained, with a spatially expanded light source L, by way of a correspondingly short focal length of the collimator K. The ratio between the expansion of the light source L in the y direction and the focal length of the collimator K is decisive; this ratio should be chosen as high as possible. However, it can also be generated by an illuminating beam path that is convergent or divergent at least in the y direction, with the aid of an astigmatic illuminating optical element, for example. A cylinder lens that focuses in the y direction and is disposed in front of the scanner plate is especially advantageous; it effects a great divergence (inclination) of the incident rays in the y direction.

An effect similar to that with cylinder lenses can be attained by means of a chirped transverse grating A" illustrated in FIG. 9. FIG. 10c illustrates the beam paths, using the chirped transverse grating A" of FIG. 9. The different deflection angles of the chirped transverse grating A" in the y direction after the first passage through the scanning graduation A" creates a beam that is fanned out in the y direction (in the first transverse orders of diffraction), so that once again averaging ensues. The minimum, $d_y$min, and maximum, $d_y$max, local transverse grating period must meet the following condition as expressed by equation (2) below, given collimated illumination:

$$\frac{1}{d_y^2 \text{min}} - \frac{1}{d_y^2 \text{max}} \geq \frac{2}{D \cdot \lambda} \quad (2)$$

where D = spacing distance between the scanner plate A and scale M and $\lambda$ = wavelength of the light source L.

If the transverse grating structure is embodied as a Fresnel cylinder lens (Fresnel zone plate), then the projecting action can be utilized for instance by compensating for the image field curvature of the collimator lens.

The scanner plate A can be tilted as shown in FIG. 10d compared to the scale M (tilting axis=graduation direction=X direction). Depending on the height of the incident beam (in the y direction), a various path length difference of the partial beams split in the transverse direction results, so that once again the desired averaging ensues.

Figure 4:
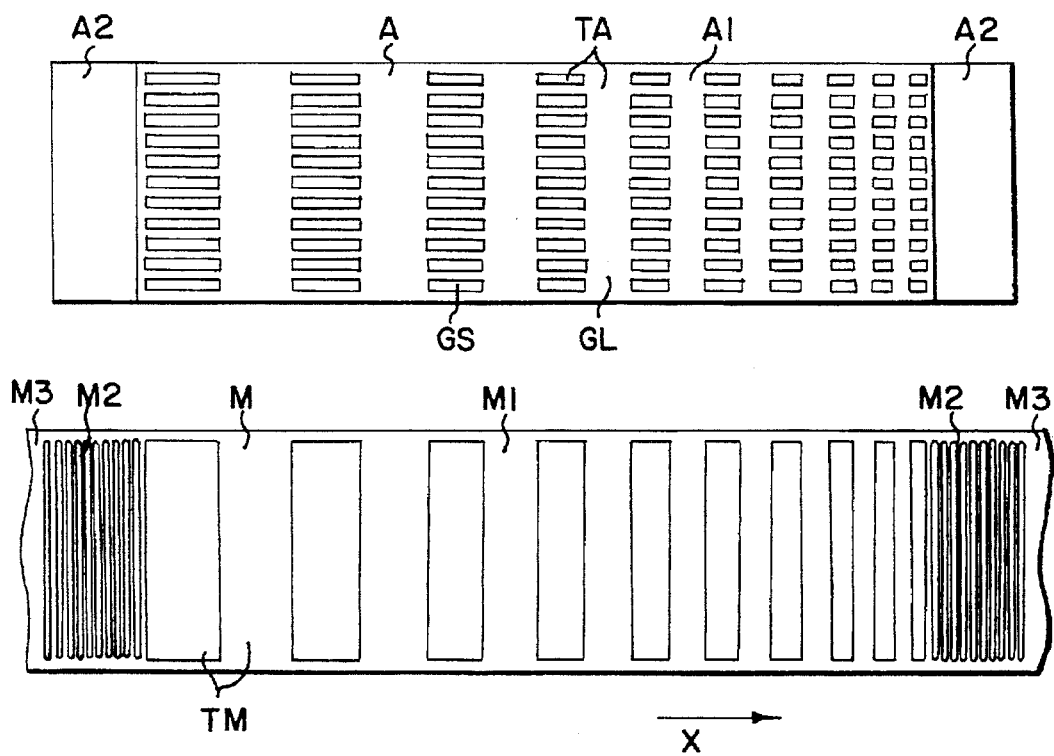
FIG. 4 illustrates a scanner plate and measuring graduation according to another preferred embodiment of the present invention.
Figure 5:
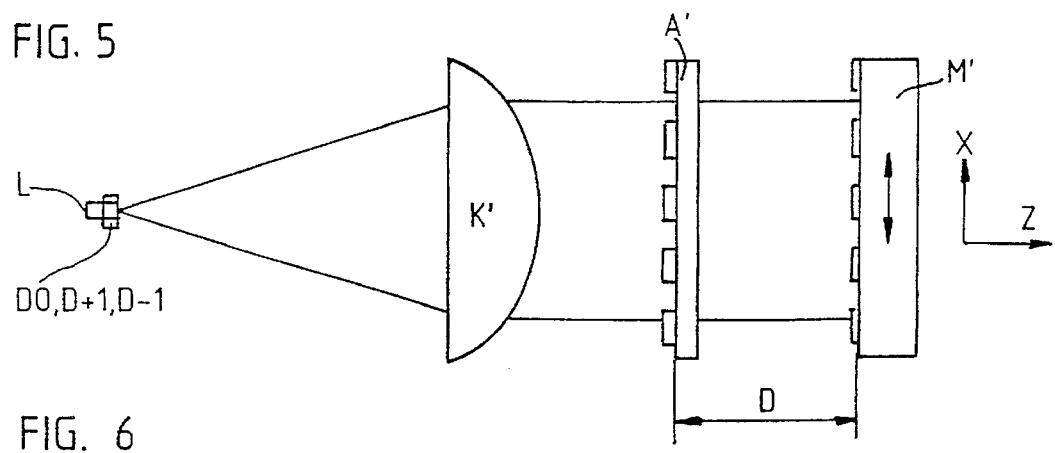
FIG. 5 is a schematic of an incremental measuring apparatus according to another preferred embodiment of the present invention.
Figure 6:
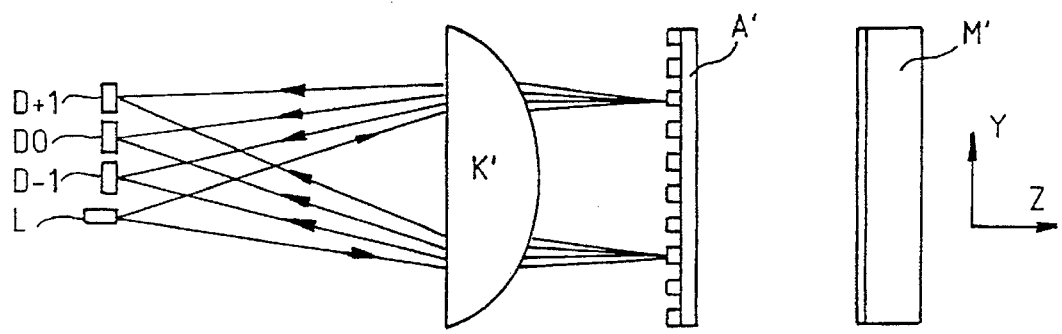
FIG. 6 is a schematic of the measuring apparatus shown in FIG. 5 rotated by 90°.

The scanner plate A" of FIG. 9 shows a variation of the scanner plates shown in FIGS. 3 and 4, in which the graduation markings GS" are disposed periodically in the measurement direction X, but in the transverse direction Y, a diffraction structure is provided whose local graduation period varies steadily along the transverse direction Y. In other words, the scanner plate A" is periodic in the measurement direction X, but "chirped" in the transverse direction Y. However, it can additionally be embodied as chirped in the measurement direction X as well.

FIGS. 5–8 illustrate in schematic an incremental measuring apparatus that is based on the above-described principle in terms of coherence. The light source L and detectors D0, D+1, D−1 correspond to those that have already been described in conjunction with FIGS. 1 and 2.

Figure 7:
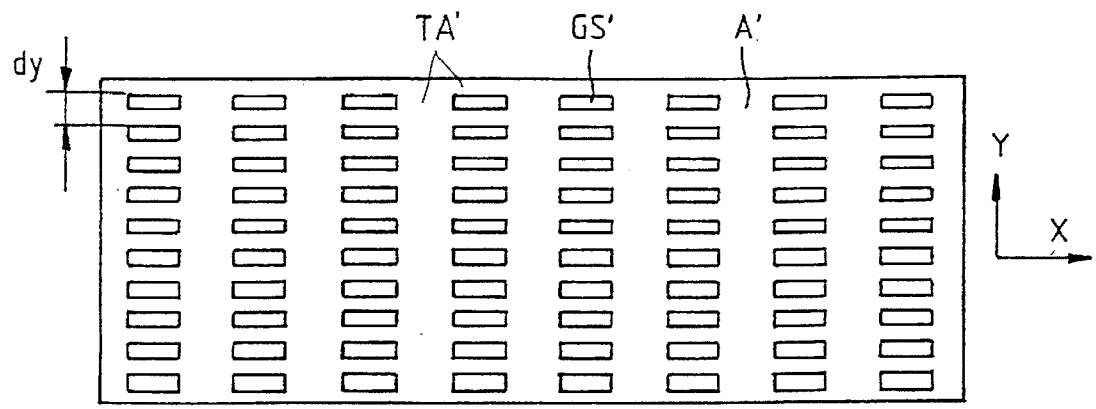
FIG. 7 illustrates a scanner plate according to another preferred embodiment of the present invention.
Figure 8:
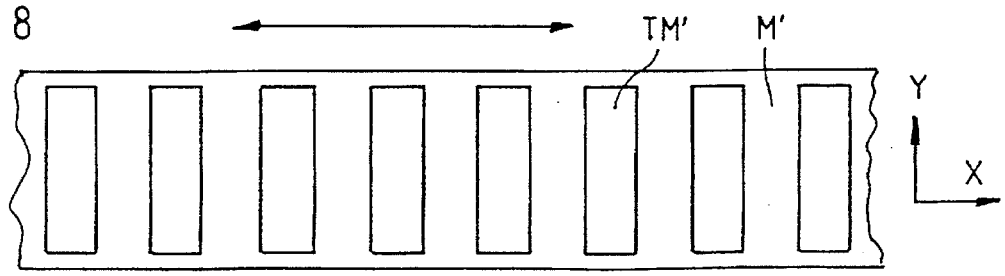
FIG. 8 illustrates a measuring graduation according to still another preferred embodiment of the present invention.

The scanner plate A' as shown in FIG. 7 has graduation markings that are embodied as phase gratings transversely to the measurement direction X. The scale M' has graduation markings that are embodied as phase gratings TM' with reflective and non-reflective lands that alternate in the measurement direction. The spacing of the diffraction elements GS' and TM' do not vary steadily along the measurement direction X, as was the case of the exemplary embodiment of FIGS. 3 and 4, for instance, which relate particularly to a reference mark.

FIG. 11 illustrates a measurement apparatus for explaining the destruction of the coherent super-position, or in other words the attainment of the incoherent superposition, as mentioned above particularly in conjunction with FIG. 10b.

Each light source point of the light source L expanded in the y direction (at right angles to the measurement direction X), after collimation by the lens K, furnishes a beam with a defined beam inclination relative to the optical axis, this inclination being dependent on the location of the light source point.

Each of these beams is split, upon the first passage through the scanning graduation A, into various transverse orders of diffractions. The scale M has no influence on the transverse beam inclinations, since it does not have any diffracting transverse structure. Upon the second passage through the scanning graduation A, the various transverse orders of diffractions are superimposed and deflected into various resultant transverse orders of diffractions. Upon the second passage through the lens K, the various transverse orders of diffractions are split up. One light source image is created in the focal plane B for each resultant orders of diffraction.

The superimposed transverse orders of diffractions can interfere constructively or destructively, depending on the path difference. Since the path difference depends on the beam inclination (interference strips of identical inclination), in the focal plane B of the lens K a strip system S, S' shown in FIG. 12 is obtained inside the various light source images.

If there is a change in the spacing distance, either of these strip systems S, S' will shift, or the intensity modulation of the strip systems oscillate in their amplitude while the strips remain at the same location. If only a fraction of one strip period is detected by a detector D0, D+1, D−1, then in the above two cases if spacing changes occur, the result is signal fluctuations. If one or more strip periods are detected by the detector D0, D+1, D−1, then spacing-independent signals are obtained by averaging.

The detectors D0, D+1, D−1 must be suited for detecting partial beams with transverse beam inclinations Δθ (in accordance with FIG. 10b), which are limited by the divergence $\theta_{Div}$ of the partial beams arriving at the scanner plate A; the following relationship as defined by equation (3) below applies:

$$\theta_{DIV} \geq \frac{d_y}{2D}, \quad (3)$$

where $d_y$=transverse graduation period, and D=spacing distance between scanner plate A and scale M.

In order to assure the interference of the partial beams split in the measurement direction X, they must have the same path lengths, or the grating constant of the transverse phase graduation GS is substantially less than that of the graduation TA in the measurement direction X, so that the path difference between partial beams of the same transverse orders of diffractions is small, so that the chronological incoherence of the light source L or of different beam inclinations cannot significantly reduce the interference. However, this does not apply to partial beams of different transverse orders of diffractions.

The invention is not limited to detecting the ±1st orders of diffraction in addition to the resultant zeroth orders of diffraction. Detectors may also be provided for detecting other or further resultant orders of diffractions.

With reference to the embodiment as a reference mark in accordance with FIG. 1–4, various modifications of the graduation structure are possible:

The land edge positions of the graduations chirped in the measurement direction X may be chosen such that the photoelement D0 furnishes a phase-opposition signal and the photoelements D±1 each furnish an in-phase signal, or vice versa;

Since the photoelements D+1 and D−1 generate an identical signal course, these photoelements can be connected in parallel. However, it is also possible to omit one of these photoelements; and The expansion of the photoelements D0, D+1, D−1 in the measurement direction X is at least great enough that the resultant ±1st (longitudinal) orders of diffraction of the chirped graduations TA, TM strikes the scanner plate A and the scale M completely, or in other words in particular with respect to the smallest local graduation period, and thus a high signal level is achieved.

The insensitivity to noise of the reference mark can be still further improved by applying to at least one side of the graduation markings M1 of the scale M an additional graduation structure M2 deviating from the first. In the arrangement of FIG. 4, adjacent to the chirped graduation fields A1 and M1 that generate a phase-opposition signal at the photoelement D0, blank window regions A2 are disposed on the scanner plate A and associated periodic graduation fields M2 are disposed on the scale M. In the zero position, light that passes through the blank window regions A2 to reach the periodic graduation fields M2 is deflected enough (small graduation period) that it no longer reaches the photoelement D0. Outside the zero position, light passes through the window A2 to reflective scale regions M3 and thus reaches the photoelement D0, and in these scale locations it increases the signal spacing between the in-phase and the phase-opposition signal.

The in-phase and phase-opposition signals, connected differentially, form a noise-insensitive reference pulse, which is triggered at the zero level for reasons of stability. Manufacturing variations as a rule require calibration of the reference signal. In particular, the direct voltage portion must be adjusted. In an arrangement similar to FIG. 4, but in which the window regions A2 are larger than the associated graduation fields M2, this adjustment can be done by means of a screw. The screw then limits the beam path through the enlarged window regions A2 to the blank scale regions M3 and thus determines the equal-light level of the phase-opposition photoelement D0.

Figure 13:
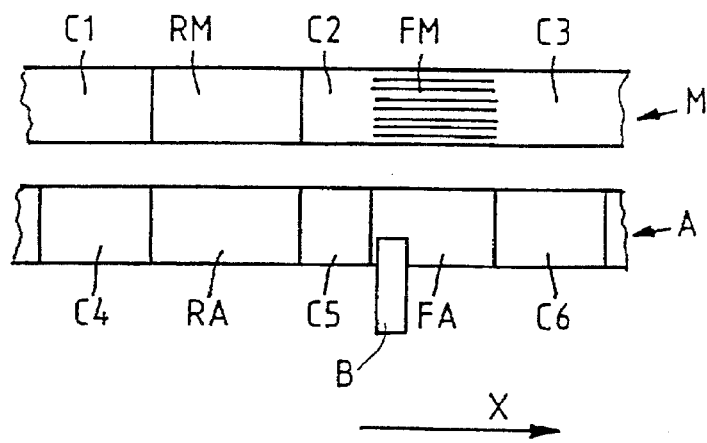
FIG. 13 illustrates a scale and a scanner plate for calibrating a reference mark signal.

Another variant of this kind of calibration is shown in FIG. 13. Only a fragment of a scale M and a scanner plate A is shown. On the scale M, there is a reference mark RM, known per se, preferably like that shown in FIG. 4. Spaced apart from it in the measurement direction X is a graduation field FM, whose grating lines extend in the measurement direction X. The regions C1, C2, C3 adjacent to it on the surface of the scale M are embodied as reflective, for instance by the application of a layer of chromium. Associated with the graduation field FM of the scale M is a transparent field FA of the same size on the scanner plate A. A scanner field RA located on the scanner plate A and for instance as shown in FIG. 3 is associated with the reference mark RM of the scale M. Absorbent regions C4, C5, C6 on the scanner plate A are associated with the regions C1, C2, C3 of the scale M.

In the near vicinity of the reference pulse maximum, at which the reference mark RM at least largely coincides with the scanning field RA, as do the graduation field FM and the field FA, light passes through the field FA to the graduation field FM and is deflected into the ±first transverse orders of diffraction and reaches the detectors D+1, D−1. The transverse grating TA has the same grating parameters as the grating in the region FM.

Figure 15A:
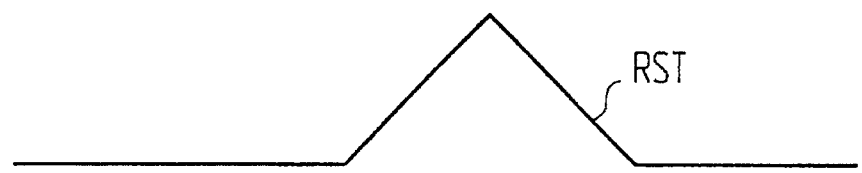
FIGS. 15 (a)–(c) illustrate the signal courses for generating the in-phase signal of FIG. 14.
Figure 15B:
Figure 15C:
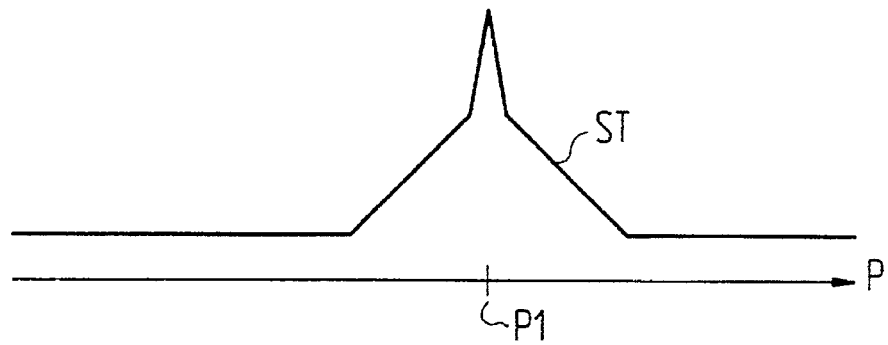
Figure 16A:
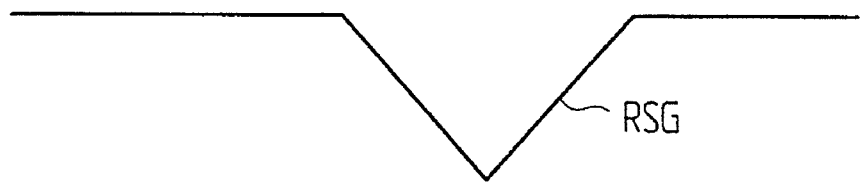
FIGS. 16 (a)–(c) illustrate the signal courses for generating the phase-opposition signal of FIG. 14.
Figure 16B:
Figure 16C:
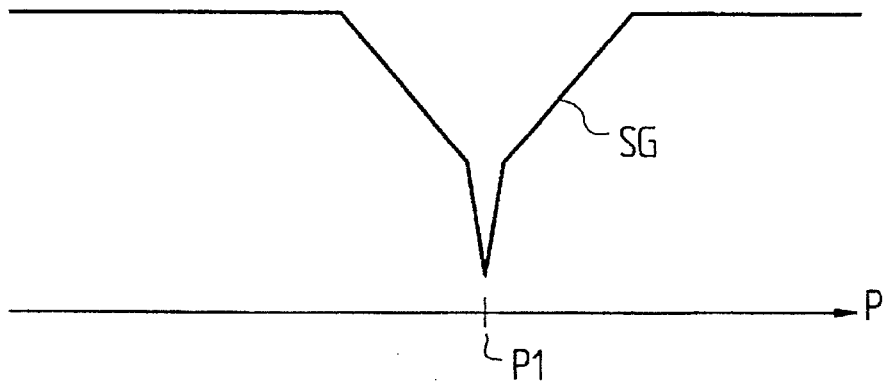

These detectors D+1, D−1 furnish the in-phase regulating signal pulse RST, shown in FIG. 15a, with a maximum at this position P1. As a result of the deflection of the light beam at the graduation field FM, the phase-opposition regulating signal pulse RSG of FIG. 16a, generated by the detector D0, has a signal minimum at this position P1. The light beam associated with the reference mark RM, together with the scanning field RA, generates partial beams that strike the detectors D0, D+1, D−1 analogously to the description of FIGS. 1–4. Without taking into account the partial beams that lead to the signal courses of FIGS. 15a, 16a, what one obtains from the detector D0 is the phase-opposition reference mark signal pulse RMG, and from the detectors D+1, D−1 the respective reference mark signal pulse RMT. The phase-opposition reference mark signal pulse RMG is shown in FIG. 16b, and the in-phase reference mark signal pulse RMT is shown in FIG. 15b. By superposition of the signals RST and RMT at the detectors D+1, D−1, the in-phase signal ST shown in FIG. 15c is generated as a summation signal. By superposition of the signals RSG and RMG at the detector D0, the phase-opposition signal SG shown in FIG. 16c is generated as a summation signal.

Figure 14:
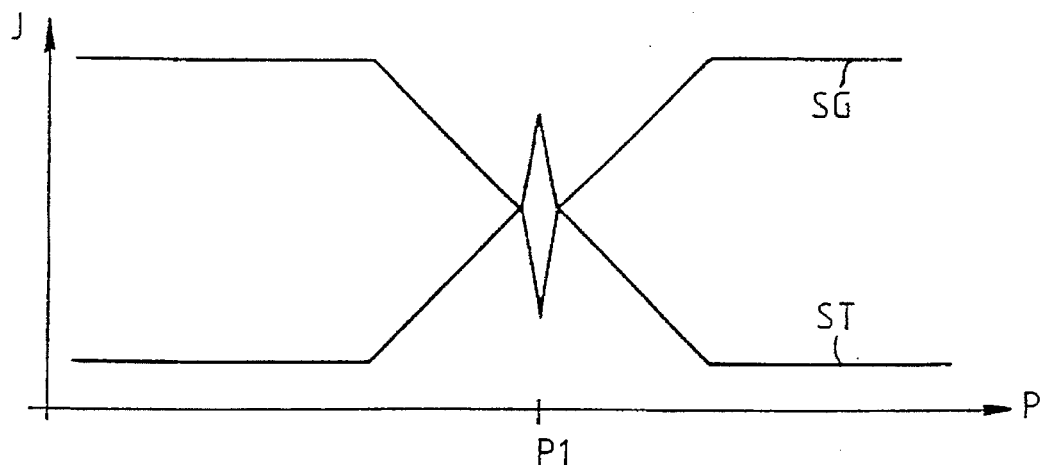
FIG. 14 is a graph of a signal course of the in-phase and phase opposition signal for generating a reference pulse.

By the cooperation of the fields FA and FM in the scanning, outside the region of coincidence of the associated fields RM, RA and FM, FA, the phase-opposition regulating signal pulse RSG is cancelled and thus the spacing between the signal levels of the in-phase signal ST and the phase opposition signal SG is increased. The noise sensitivity of the measuring apparatus is thereby decreased. On the other hand, in the region of coincidence, the in-phase signal ST is cancelled by the action of the in-phase regulating signal pulse RST. By means of a screw or other variable screen B, the beam path that passes through the fields FA and FM is partially screened out, as a result of which the reference pulse can be adjusted relative to the trigger level. The screw or screen B can be located either between the condenser K and the scanner plate A or in the region between the light source L and the condenser K. This embodiment accordingly leads not only to the actual reference pulse calibration but also to an increase in the signal-to-noise ratio between the in-phase signal ST and the phase-opposition signal SG outside the reference pulse maximum, as shown in FIG. 14. The signal level J is plotted as a function of the position P of the scale M.

Figure 17:
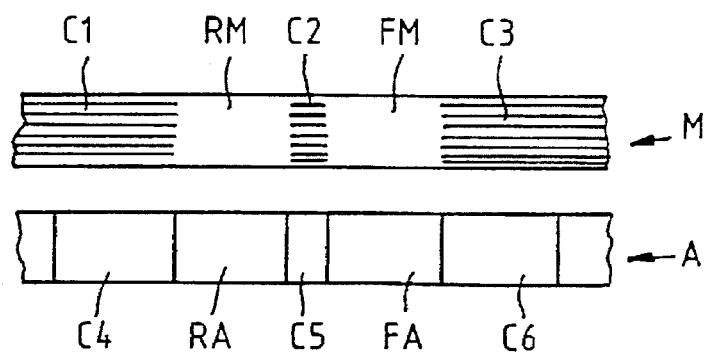
FIG. 17 illustrates a scale and a scanner plate for calibration according to another preferred embodiment of the present invention.

In FIG. 17, the reflective region C1, C2 and C3 and the graduation field FM are transposed on the scale M. One thus obtains a similarly favorable signal course to that described in conjunction with FIGS. 13–16, if the reference mark RM is embodied such that at the transverse zeroth order of diffraction, the in-phase signal ST is generated. As described for FIG. 13, a screen can be associated with the transparent field FA, for calibration purposes.

According to the invention, the calibration is accordingly achieved by the cooperation of fields, each additionally located next to the reference mark RM on the scanner plate A and scale M. These fields may be embodied as transparent or reflective, or as gratings, prisms, holographic-optical elements, diffractive-optical elements, etc., and may have both projecting and non-projecting properties. A defined shadowing (displaceable screen or screw) effects a regulation of the signal level of the in-phase signal ST or phase-opposition signal SG.

The calibration mechanism is not limited to the calibration of reference mark signals but instead can logically also be used to calibrate the analog scanning signals of an incremental or encoding measuring system according to the invention.

The invention is usable for linear and angular measuring systems, and the scanning can be done using transmitted or incident light.

While this invention has been shown and described in connection with the preferred embodiments, it is apparent that certain changes and modifications, in addition to those mentioned above, may be made from the basic features of the present invention. Accordingly, it is the intention of the Applicants to protect all variations and modifications within the true spirit and valid scope of the present invention.

What is claimed is:

1. An apparatus for generating position dependent signals comprising:

a light source having a spectral width $\Delta\lambda$;

a scale with an amplitude or phase grating;

at least one scanner plate that scans the scale in a measuring direction wherein the scanner plate is spaced from the scale by a scanning distance wherein the at least one scanner plate has a plurality of differently configured first and second regions (CS, GL), disposed alternatingly each side by side in the measuring direction, which form a phase grating in the measuring direction, wherein at least the first regions (GS) have a phase grating crosswise to the measuring direction, whose division lines extend at an angle other than 90° to the measuring direction, and light from the light source is split by the first and second regions into transversely differently inclined partial beams, and these partial beams strike the scale in order to generate a plurality of partial beams diffracted in the measuring direction, which are made to interfere and are aimed at detectors in order to generate the position-dependent signals.

2. The apparatus of claim 1 wherein the light from the light source is aimed at the scanner plate from the scanner plate to the scale and from the scale to a further scanner plate and onward to the detectors, whereupon in the pass of the further scanner plate, partial beams diffracted in the measuring direction at the scale interfere with one another.

3. The apparatus of claim 1 wherein the detectors are spaced apart transversely to the measurement direction.

4. The apparatus of claim 1, wherein the first regions of the scanner plate are transversal grating regions spaced apart from one another in the measuring direction, and the second regions are gaps located between them.

5. The apparatus of claim 1, wherein the first and second regions of the scanner plate are each transversal grating regions, the transversal grating region of the first grating regions differing from the transversal grating region of the second grating regions.

6. The apparatus of claim 1, wherein a collimator lens is disposed between the light source and the scanner plate, in order to aim collimated light at the scanner plate and in order to focus beams of light that emerge from the scanner plate with the same inclination in the direction of the detectors each at a common detector.

7. The apparatus of claim 1, wherein the first and second regions of the scanner plate forms an incremental graduation in the measurement direction whose graduation period is constant in the measurement direction.

8. The apparatus of claim 1, wherein the first and second regions of the at least one scanner plate forms a graduation region whose graduation period varies steadily as a function of location in the measurement direction.

9. The apparatus of claim 8, wherein the scale has a graduation region whose graduation period varies steadily as a function of location in the measurement direction.

10. The apparatus of claim 1 wherein the light from the light source is aimed at the scanner plate from the scanner plate to the scale and from the scale to the same scanner plate and onward to the detectors, wherein upon the second pass of the scanner plate, the partial beams diffracted in the measuring direction at the scale interfere with one another.

11. The apparatus of claim 10 wherein the first regions (GS) of the scanner plate are embodied such that no transverse zeroth order of diffraction occurs.

12. The apparatus of claim 10 wherein the grating of the scale is embodied such that no longitudinal zeroth order of diffraction occurs.

13. The apparatus of claim 10, wherein beams of light which pass twice through the first regions of the scanner plate and beams of light which pass twice through the second regions of the scanner plate are aimed at a common detector (D0), and furthermore the beams of light which in the first and second pass of the scanner plate each pass through different regions are aimed at a further detector (D+1).

14. The apparatus according to claim 10 wherein at least one further optical element is applied to the scale which optical element aims a light beam, originating at the light source to at least one of the detectors and influences at least one position-dependent signal.

15. The apparatus of claim 10 wherein at least one further optical element is applied to the scanner plate which optical element aims a light beam, originating at the light source to at least one of the detectors and influences at least one position-dependent signal.

16. The apparatus of claim 15 wherein the light beam is limited by a screen located in the beam path.

17. The apparatus of claim 10 wherein the partial beams split transversely after the second passage through the scanner plate are superimposed incoherently on one another.

18. The apparatus of claim 17 wherein the incoherence is attained by the light source having a broad wavelength spectrum and a short coherence length.

19. The apparatus of claim 18 wherein the spacing distance depends on a grating constant ($d_y$) of the first regions (GS) and on the spectral width $\Delta\lambda$ of the light source in accordance with the following equation:

$$D > 0.3 \frac{d_y^2}{\Delta\lambda}.$$

20. The apparatus of claim 18 wherein the light source is an LED.

21. The apparatus of claim 18 or 20 wherein the distance between the scanner plate and the scale is chosen such that the path length difference of the partial beams is greater than the coherence length of the light source so that the partial beams, which upon the first passage through the scanner plate are split into various transverse orders of diffraction and which upon the second passage through the scanner plate are superimposed, do not interfere with one another.

22. The apparatus of claim 17 wherein the partial beams superimposed on one another have a plurality of different path length differences.

23. The apparatus of claim 22 wherein the illumination of the scanner plate is effected with a plurality of partial beams of differing inclination ($\Delta\theta$).

24. The apparatus of claim 23 wherein the first regions (GS) of the scanner plate have a graduation period that varies continuously at right angles to the measurement direction.

25. The apparatus of claim 23 wherein the scanner plate is tilted relative to the scale about a tilt axis and the tilt axis extends in the measurement direction.

26. The apparatus of claim 23, wherein the illumination of the scanner plate is effected with a divergent light beam at right angles to the measurement direction.

27. The apparatus of claim 23 wherein the illumination of the scanner plate is effected with a convergent light beam at right angles to the measurement direction.

28. The apparatus of claim 27 wherein after the light source an astigmatic optical illuminating element is provided.

29. An apparatus for generating position-dependent signals comprising:

a light source emitting light;

a scale wherein the scale has an amplitude or phase graduation;

at least one scanner plate that scans the scale in a measuring direction, wherein the at least one scanner plate has a phase graduation which has markings with a phase graduation, wherein the markings extend at an angle to the measurement direction that is other than 90°, wherein the light from the light source is split transversely by the at least one scanner plate into partial beams which are detected in order to generate position-dependent signal wherein the light from the light source is aimed at the scanner plate from the scanner plate and from the scale to the scanner plate to the scale and onward to a plurality of detectors spaced apart transversely to the measurement direction and the partial beams are split transversely after a second passage through the scanner plate are superimposed incoherently on one another wherein the incoherence is attained by the light source having a broad wavelength spectrum and a short coherence length the distance between the scanner plate and the scale is chosen such that the path length difference of the partial beams is greater than the coherence length of the light source so that the partial beams, which upon a first passage through the scanner plate are split into various transverse orders of diffraction and which upon the second passage through the scanner plate are superimposed, do not interfere with one another.

30. An apparatus according to claim 29 wherein the markings (GS) of the scanner plate are embodied such that no transverse zeroth order of diffraction occurs.

31. An apparatus according to claim 29 wherein the graduation of the scale is embodied such that no longitudinal zeroth order of diffraction occurs.

32. An apparatus for generating position-dependent signals comprising:

a light source emitting light, the light source comprising an LED;

a scale wherein the scale has an amplitude or phase graduation;

at least one scanner plate that scans the scale in a measuring direction, wherein the at least one scanner plate has a phase graduation which has markings with a phase graduation, wherein the markings extend at an angle to the measurement direction that is other than 90°, wherein the light from the light source is split transversely by the at least one scanner plate which are detected in order to generate position-dependent signal wherein the light of the light source is aimed at the scanner plate from the scanner plate to the scale and from the scale to the scanner plate and onward to a plurality of detectors spaced apart transversely to the measurement direction and the partial beams split transversely after a second passage through the scanner plate are superimposed incoherently on one another wherein the incoherence is attained by the light source having a broad wavelength spectrum and a short coherence length wherein the distance between the scanner plate and the scale is chosen such that the path length difference of the partial beams is greater than the coherence length of the light source so that the partial beams, which upon a first passage through the scanner plate are split into various transverse orders of diffraction and which upon the second passage through the scanner plate are superimposed, do not interfere with one another.

33. An apparatus for generating position-dependent signals comprising:

a light source emitting light having a spectral width $\Delta\lambda$;

a scale wherein the scale has an amplitude or phase graduation;

at least one scanner plate that scans the scale in a measuring direction, wherein the at least one scanner plate has a first region (GS) in the form of a phase graduation which has markings with a phase graduation, wherein the markings extend at an angle to the measurement direction that is other than 90°, wherein the light from the light source is split transversely by the at least one scanner plate which are detected in order to generate position-dependent signal wherein the light from the light source is aimed at the scanner plate from the scanner plate to the scale and from the scale to the scanner plate and onward to a plurality of detectors spaced apart transversely to the measurement direction and the partial beams split transversely after a second passage through the scanner plate are superimposed incoherently on one another wherein the incoherence is attained by the light source having a broad wavelength spectrum and a short coherence length wherein the spacing distance between the scale and the scanner plate depends on the grating constant (d) of the phase graduation (GS) of the first region and on a spectral width $\Delta\lambda$ of the light source in accordance with the following equation:

$$D > 0.3 \frac{d_y^2}{\Delta\lambda}.$$

34. An apparatus for generating position-dependent signals comprising:

a light source emitting light;

a scale wherein the scale has an amplitude or phase graduation;

at least one scanner plate that scans the scale in a measuring direction, wherein the at least one scanner plate has a phase graduation which has markings with a phase graduation, wherein the markings extend at an angle to the measurement direction that is other than 90°, wherein the light from the light source is split transversely by the at least one scanner plate which are detected in order to generate position-dependent signal wherein the light from the source is aimed at the scanner plate from the scanner plate to the scale and from the scale to a further scanner plate and onward to a plurality of detectors spaced apart transversely to the measurement direction and the partial beams are split transversely after a second passage through the further scanner plate are superimposed incoherently on one another wherein the incoherence is attained by the light source having a broad wavelength spectrum and a short coherence length difference of the partial beams is greater than the coherence length of the light source so that the partial beams, which upon a first passage through the scanner plate are split into various transverse orders of diffraction and which upon the second passage through the further scanner plate are superimposed, do not interfere with one another.

35. An apparatus for generating position-dependent signals comprising:

a light source emitting light, the light source comprising an LED;

a scale wherein the scale has an amplitude or phase graduation;

at least one scanner plate that scans the scale in a measuring direction, wherein the at least one scanner plate has a phase graduation which has markings with a phase graduation wherein the markings, extend at an angle to the measurement direction that is other than 90° wherein the light from the light source is split transversely by the at least one scanner plate, which are detected in order to generate position-dependent signal wherein the light from the light source is aimed at the scanner plate from the scanner plate to the scale and from the scale to a further scanner plate and onward to a plurality of detectors spaced apart transversely to the measurement direction and the partial beams split transversely after a second passage through the further scanner plate are superimposed incoherently on one another wherein the incoherence is attained by the light source having a broad wavelength spectrum and a short coherence length wherein the distance between the scanner plate and the scale and the scale and the further scanner plate is chosen such that the path length difference of the partial beam is greater than the coherence length of the light source so that the partial beams, which upon a first passage through the scanner plate are split into various transverse orders of diffraction and which upon the second passage through the further scanner plate are superimposed, do not interfere with one another.

36. An apparatus of generating position-dependent signals comprising:

a light source emitting light;

a scale wherein the scale has an amplitude or phase graduation;

at least one scanner plate that scans the scale in a measuring direction, wherein the at least one scanner plate has a phase graduation which has markings with a phase graduation wherein the markings, extend at an angle to the measurement direction that is other than 90° wherein the light from the light source is split transversely by the at least one scanner plate, which are detected in order to generate position-dependent signal wherein the light from the source is aimed at the scanner plate from the scanner plate to the scale and from the scale to a further scanner plate and onward to a plurality of detectors spaced apart transversely to the measurement direction and the partial beams split transversely after a second passage through the further scanner plate are superimposed incoherently on one another wherein the incoherence is attained by the light source having a broad wavelength spectrum and a short coherence length wherein the spacing distance between the scanner plate and the scale and the scale and the further scanner plate depends on the grating constant (d) of the phase graduation (GS) of the first fields and on a spectral width $\Delta\lambda$ of the light source in accordance with the following equation:

$$D > 0.3 \frac{d_y^2}{\Delta\lambda}.$$

* * * * *

UNITED STATES PATENT AND TRADEMARK OFFICE
CERTIFICATE OF CORRECTION

PATENT NO. : 5,648,658
DATED : July 15, 1997
INVENTOR(S) : Wolfgang Holzapfel et al.

It is certified that error appears in the above-indentified patent and that said Letters Patent is hereby corrected as shown below:

In column 10, line 37, change "CS" to --GS--.

Signed and Sealed this

Twenty-eighth Day of December, 1999

Attest:

Attesting Officer

Q. TODD DICKINSON

Acting Commissioner of Patents and Trademarks